United States Patent
Walker et al.

(10) Patent No.: US 10,013,666 B2
(45) Date of Patent: Jul. 3, 2018

(54) PRODUCT LIFECYCLE SUSTAINABILITY SCORE TRACKING AND INDICIA

(75) Inventors: Marcia Elaine Walker, Durham, NC (US); Philip John Kaufman, Milwaukee, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 1486 days.

(21) Appl. No.: 12/429,795

(22) Filed: Apr. 24, 2009

(65) Prior Publication Data

US 2010/0274629 A1   Oct. 28, 2010

(51) Int. Cl.
  *G06Q 10/00* (2012.01)
  *G06Q 10/06* (2012.01)
  *G06Q 10/08* (2012.01)
  *G06Q 30/02* (2012.01)

(52) U.S. Cl.
  CPC ....... *G06Q 10/06375* (2013.01); *G06Q 10/06* (2013.01); *G06Q 10/087* (2013.01); *G06Q 10/30* (2013.01); *G06Q 30/0201* (2013.01); *Y02W 90/20* (2015.05)

(58) Field of Classification Search
  USPC ............ 705/7.32, 28, 38, 7.29, 50; 238/380; 235/385; 709/204, 226
  See application file for complete search history.

(56) References Cited

U.S. PATENT DOCUMENTS

| | | | |
|---|---|---|---|
| 4,039,392 A | 8/1977 | Singh | |
| 4,300,125 A | 11/1981 | Loshing et al. | |
| 4,341,345 A | 7/1982 | Hammer et al. | |
| 4,383,298 A | 5/1983 | Huff et al. | |
| 4,624,685 A | 11/1986 | Lueckenotte et al. | |
| 4,827,395 A | 5/1989 | Anders et al. | |
| 5,043,929 A | 8/1991 | Kramer et al. | |
| 5,202,996 A | 4/1993 | Sugino et al. | |
| 5,251,205 A | 10/1993 | Callon et al. | |
| 5,297,057 A | 3/1994 | Kramer et al. | |
| 5,646,862 A | 7/1997 | Jolliffe et al. | |
| 5,736,983 A | 4/1998 | Nakajima et al. | |
| 5,822,207 A | 10/1998 | Hazama et al. | |
| 5,924,486 A | 7/1999 | Ehlers et al. | |

(Continued)

FOREIGN PATENT DOCUMENTS

| EP | 0977137 A2 * | 2/2000 | ............ G06F 17/60 |
|---|---|---|---|
| EP | 0977137 A2 | 2/2000 | |

(Continued)

OTHER PUBLICATIONS

Kiritsis et al.; Research issues on product lifecycle management and information tracking using smart embedded systems; Advanced Engineering Informatics 17 (2003) 189-202.*

(Continued)

*Primary Examiner* — Gurkanwaljit Singh
(74) *Attorney, Agent, or Firm* — Fletcher Yoder, P.C.

(57) ABSTRACT

The claimed subject matter relates to an architecture that can facilitate sustainability monitoring and indicia thereof for a product over the course of the entire lifecycle of the product. In particular, the architecture can acquire a status update associated with a state of the product. Based upon the state, the architecture can determine an impact of that state to a sustainability score associated with the product.

16 Claims, 10 Drawing Sheets

(56) References Cited

U.S. PATENT DOCUMENTS

| | | | |
|---|---|---|---|
| 5,983,622 | A | 11/1999 | Newburry et al. |
| 6,012,053 | A | 1/2000 | Pant et al. |
| 6,015,783 | A | 1/2000 | von der Osten et al. |
| 6,076,108 | A | 6/2000 | Courts et al. |
| 6,263,255 | B1 | 7/2001 | Tan et al. |
| 6,281,784 | B1 | 8/2001 | Redgate et al. |
| 6,289,252 | B1 | 9/2001 | Wilson et al. |
| 6,321,983 | B1* | 11/2001 | Katayanagi et al. ......... 235/380 |
| 6,473,893 | B1 | 10/2002 | Kay et al. |
| 6,507,774 | B1 | 1/2003 | Reifman et al. |
| 6,633,823 | B2 | 10/2003 | Barton et al. |
| 6,701,298 | B1 | 3/2004 | Jutsen |
| 6,732,055 | B2 | 5/2004 | Bagepalli et al. |
| 6,747,368 | B2 | 6/2004 | Jarrett, Jr. |
| 6,785,592 | B1 | 8/2004 | Smith et al. |
| 6,857,020 | B1* | 2/2005 | Chaar et al. ................. 709/226 |
| 6,859,755 | B2 | 2/2005 | Eryurek et al. |
| 7,043,316 | B2 | 5/2006 | Farchmin et al. |
| 7,274,975 | B2 | 9/2007 | Miller |
| 7,277,864 | B2* | 10/2007 | Ohnemus et al. .......... 705/7.32 |
| 7,409,303 | B2 | 8/2008 | Yeo et al. |
| 7,451,019 | B2 | 11/2008 | Rodgers |
| 7,477,956 | B2 | 1/2009 | Huang et al. |
| 7,531,254 | B2 | 5/2009 | Hibbs et al. |
| 7,565,351 | B1 | 7/2009 | Callaghan |
| 7,747,416 | B2 | 6/2010 | Deininger et al. |
| 7,788,189 | B2 | 8/2010 | Budike, Jr. |
| 8,068,938 | B2 | 11/2011 | Fujita |
| 8,271,363 | B2 | 9/2012 | Branscomb |
| 2001/0011368 | A1 | 8/2001 | Graser et al. |
| 2002/0013744 | A1* | 1/2002 | Tsunenari et al. ............. 705/28 |
| 2002/0026343 | A1* | 2/2002 | Duenke ............................. 705/8 |
| 2002/0066072 | A1 | 5/2002 | Crevatin |
| 2002/0099464 | A1 | 7/2002 | O'Connor et al. |
| 2002/0099804 | A1 | 7/2002 | O'Connor et al. |
| 2002/0116239 | A1* | 8/2002 | Reinsma et al. ................. 705/7 |
| 2002/0128933 | A1 | 9/2002 | Day et al. |
| 2002/0168621 | A1 | 11/2002 | Cook et al. |
| 2002/0169582 | A1 | 11/2002 | Eryurek et al. |
| 2002/0178047 | A1 | 11/2002 | Or et al. |
| 2002/0198755 | A1* | 12/2002 | Birkner et al. ................... 705/8 |
| 2003/0014500 | A1 | 1/2003 | Schleiss |
| 2003/0028527 | A1 | 2/2003 | Crosby et al. |
| 2003/0061091 | A1 | 3/2003 | Amaratunga et al. |
| 2003/0088370 | A1 | 5/2003 | Bagepalli et al. |
| 2003/0110065 | A1* | 6/2003 | Twigge-Molecey ............. 705/7 |
| 2003/0110369 | A1 | 6/2003 | Fish et al. |
| 2003/0171851 | A1 | 9/2003 | Brickfield et al. |
| 2003/0221119 | A1 | 11/2003 | Geiger et al. |
| 2004/0088119 | A1 | 5/2004 | Landgraf |
| 2004/0107345 | A1 | 6/2004 | Brandt et al. |
| 2004/0117240 | A1* | 6/2004 | Ness et al. ...................... 705/10 |
| 2004/0143467 | A1 | 7/2004 | McAllister et al. |
| 2004/0158506 | A1* | 8/2004 | Wille .............................. 705/28 |
| 2004/0199294 | A1 | 10/2004 | Fairlie et al. |
| 2004/0205412 | A1 | 10/2004 | Staron et al. |
| 2004/0249697 | A1* | 12/2004 | Ohnemus et al. ............. 705/10 |
| 2004/0260489 | A1 | 12/2004 | Mansingh et al. |
| 2004/0261673 | A1 | 12/2004 | Allen et al. |
| 2005/0015287 | A1* | 1/2005 | Beaver ............................. 705/7 |
| 2005/0034023 | A1 | 2/2005 | Maturana et al. |
| 2005/0065971 | A1* | 3/2005 | Honda ........................... 707/102 |
| 2005/0143865 | A1 | 6/2005 | Gardner |
| 2005/0144154 | A1 | 6/2005 | Demesa et al. |
| 2005/0171910 | A1* | 8/2005 | Wu et al. ........................ 705/50 |
| 2005/0198241 | A1 | 9/2005 | Pavlik et al. |
| 2005/0198333 | A1 | 9/2005 | Dinges |
| 2005/0234904 | A1 | 10/2005 | Brill et al. |
| 2005/0278296 | A1* | 12/2005 | Bostwick ......................... 707/1 |
| 2006/0026145 | A1 | 2/2006 | Beringer et al. |
| 2006/0248002 | A1* | 11/2006 | Summer et al. ................ 705/38 |
| 2007/0038646 | A1 | 2/2007 | Thota |
| 2007/0073750 | A1 | 3/2007 | Chand et al. |
| 2007/0078736 | A1 | 4/2007 | Chand et al. |
| 2007/0168213 | A1 | 7/2007 | Comrie |
| 2007/0226068 | A1 | 9/2007 | Keil et al. |
| 2007/0283030 | A1 | 12/2007 | Deininger et al. |
| 2008/0015975 | A1 | 1/2008 | Ivchenko et al. |
| 2008/0046387 | A1 | 2/2008 | Gopal et al. |
| 2008/0046407 | A1 | 2/2008 | Shah et al. |
| 2008/0059457 | A1* | 3/2008 | Ohnemus et al. ................. 707/5 |
| 2008/0079560 | A1 | 4/2008 | Hall et al. |
| 2008/0127779 | A1 | 6/2008 | Morales Cerda et al. |
| 2008/0154749 | A1 | 6/2008 | D'hooghe et al. |
| 2008/0255889 | A1 | 10/2008 | Geisler et al. |
| 2008/0255899 | A1 | 10/2008 | McConnell et al. |
| 2008/0270272 | A1 | 10/2008 | Branscomb |
| 2008/0272934 | A1 | 11/2008 | Wang et al. |
| 2008/0319812 | A1* | 12/2008 | Sousa et al. ...................... 705/7 |
| 2009/0083843 | A1 | 3/2009 | Wilkinson, Jr. et al. |
| 2009/0099887 | A1 | 4/2009 | Sklar et al. |
| 2009/0100159 | A1 | 4/2009 | Extra |
| 2009/0132176 | A1 | 5/2009 | McConnell et al. |
| 2009/0138415 | A1 | 5/2009 | Lancaster |
| 2009/0177505 | A1 | 7/2009 | Dietrich et al. |
| 2009/0222307 | A1 | 9/2009 | Beaver |
| 2009/0281674 | A1 | 11/2009 | Taft |
| 2009/0281677 | A1 | 11/2009 | Botich et al. |
| 2009/0313164 | A1 | 12/2009 | Hoglund |
| 2009/0319315 | A1 | 12/2009 | Branscomb |
| 2010/0023360 | A1 | 1/2010 | Nadhan |
| 2010/0030601 | A1* | 2/2010 | Warther et al. ................... 705/7 |
| 2010/0042455 | A1 | 2/2010 | Liu et al. |
| 2010/0057480 | A1 | 3/2010 | Arfin et al. |
| 2010/0088136 | A1 | 4/2010 | Cheng et al. |
| 2010/0100405 | A1* | 4/2010 | Lepore et al. ..................... 705/7 |
| 2010/0131343 | A1 | 5/2010 | Hamilton |
| 2010/0138003 | A1 | 6/2010 | August et al. |
| 2010/0217642 | A1 | 8/2010 | Crabtree et al. |
| 2010/0217651 | A1 | 8/2010 | Crabtree et al. |
| 2010/0218108 | A1 | 8/2010 | Crabtree et al. |
| 2010/0249975 | A1* | 9/2010 | Rezayat ......................... 700/106 |
| 2010/0262445 | A1 | 10/2010 | DeSorbo |
| 2010/0274367 | A1 | 10/2010 | Kaufman et al. |
| 2010/0274377 | A1 | 10/2010 | Kaufman et al. |
| 2010/0274602 | A1 | 10/2010 | Kaufman et al. |
| 2010/0274603 | A1 | 10/2010 | Walker et al. |
| 2010/0274611 | A1 | 10/2010 | Kaufman et al. |
| 2010/0274612 | A1 | 10/2010 | Walker et al. |
| 2010/0274810 | A1 | 10/2010 | Walker et al. |
| 2010/0275147 | A1 | 10/2010 | Kaufman et al. |
| 2010/0292856 | A1 | 11/2010 | Fujita |
| 2010/0314940 | A1 | 12/2010 | Palmer et al. |
| 2010/0318233 | A1 | 12/2010 | Yunes et al. |
| 2010/0332373 | A1 | 12/2010 | Crabtree et al. |
| 2011/0046800 | A1 | 2/2011 | Imes et al. |
| 2011/0071721 | A1 | 3/2011 | Gilfillan et al. |
| 2011/0172838 | A1 | 7/2011 | Pai et al. |
| 2011/0273022 | A1 | 11/2011 | Dennis et al. |

FOREIGN PATENT DOCUMENTS

| | | |
|---|---|---|
| WO | 2004074954 A2 | 9/2004 |
| WO | 2008011427 A2 | 1/2008 |

OTHER PUBLICATIONS

Jawahir, I. S., et al. "Total life-cycle considerations in product design for sustainability: A framework for comprehensive evaluation." Proc. 10th Int. Research/Expert Conf.(TMT 2006), Barcelona, Spain. 2006.*

Jaafar, I. H., et al. "Product design for sustainability: a new assessment methodology and case studies." Environmentally Conscious Mechanical Design (2007).*

A.D. Jayal, F. Badurdeen, O.W. Dillon Jr., I.S. Jawahir, Sustainable manufacturing: Modeling and optimization challenges at the product, process and system levels, CIRP Journal of Manufacturing Science and Technology, vol. 2, Issue 3, 2010, pp. 144-152, ISSN 1755-5817.*

Dillenburg, Stephen, Timothy Greene, and O. Homer Erekson. "Approaching socially responsible investment with a comprehen-

(56) References Cited

OTHER PUBLICATIONS sive ratings scheme: total social impact." Journal of Business Ethics 43.3 (2003): 167-177.*
GE Energy. "Energy and Asset Performance—Fact Sheet." Sep. 2005. General Electric Company. Published online at [http://www.gepower.com/prod_serv/serv/industrial_service/en/downloads/gea14163_eap.pdf], retrieved Apr. 13, 2009. 2 pages.
ABB. "Energy Management Solution for the Process Industry—Energy Management and Optimization." Apr. 6, 2007 Published online at [http://library.abb.com/global/scot/scot313.nsf/veritydisplay/5e48etb88a7e1cbac125734600737b02/$File/3BFI405000R4001_en_Energy_Management_and_Optimization_3.5.pdf], retrieved Apr. 13, 2009. 12 pages.
ABB. "Energy Management and Optimization for the Process Industries—Advanced IT Tools for Planning, Monitoring, Controlling, and Reporting Energy System Operations." Published online at [http://library.abb.com/global/scot/scot296.nsf/veritydisplay/bd2a898a24267c46c12571c70070a851/$File/3BFI402000R3001_en_Advanced_IT_Tools_for_Energy_Management.pdf], retrieved Apr. 13, 2009. 6 pages.
Dietmair A, et al., "Energy Consumption Modeling and Optimization for Production Machines". Sustainable energy technologies, 2008. ICSET 2008. IEEE International Conference on IEEE, Piscataway, NJ, USA, Nov. 24, 2008, pp. 574-579, XP031442235, ISBN: 978-1-4244-1887-9.
European Search Report for European Patent Application No. 10160649.9-1238 dated Sep. 23, 2010, 8 pages.
European Search Report for European Patent Application No. 101605814-1238 dated Sep. 23, 2010, 8 pages.
European Search Report for European Patent Application No. 10160673.9-1238 dated Sep. 23, 2010, 9 pages.
Kiritsis D, et al., Research issues on product lifecycle management and information tracking using smart embedded systems. Advanced Engineering Informatics, Elsevier Lnkd—DOI: 10.1016/J. AEI. 2004.09.005, vol. 17, No. 3-4, Jul. 1, 2003, pp. 189-202, XP004595481 ISSN: 1474-0346.
Y-S Ma, et al., Product Lifecycle Analysis and Optimization in an Eco-value Based, Sustainable and Unified Approach. Industrial Informatics, 2006 IEEE International Conference on, IEEE, PI, Aug. 1, 2006, pp. 537-541 XP031003409, ISBN: 978-0-7803-9700-2.
Seref Erkayhan Ed—Ding Zhen-Hua et al., The Use of RFID enables a holistic Information Management within Product Lifecycle Management (PLM). RFID EURASIA, 2007 1st Annual, IEEE, PI Sep. 1, 2007, pp. 1-4, XP031153342. ISBN: 978-975-1-5660-1.
European Search Report for European Patent Application No. 10160811.5 dated Sep. 20, 2010, 9 pages.
European Search Report for European Application No. 10160585.5-1527 / 2254061 datedDec. 20, 2010, 9 pages.
OA dated Feb. 16, 2011 for U.S. Appl. No. 12/429,813, 21 pages.
European Search Report dated Nov. 4, 2010 for European Patent Application No. EP 10 16 0737, 9 pages.
European Search Report completed Aug. 6, 2010 for European Patent Application No. EP 10 16 0810, 2 pages.
EPO : Notice from the European patent Office dated Oct. 1, 2007 concerning business methods. Official Journal of the European Patent Office, vol. 30, No. 11, Nov. 1, 2007, pp. 592-593.
Kennedy, Pat, et al., "In Pursuit of the Perfect Plant—A Business and Technical Guide", Apr. 2008, Chapter 9—Energy Management, pp. 251-283; published by Evolved Technologist Press, New York, New York, USA.
Kouloura, et al., "A Systems Approach to Corporate Sustainability in Energy Management of Industrial Units", IEEE Systems Journal, vol. 2, No. 4, Dec. 2008, pp. 442-452.
Yang, et al., "Eco-Design for Product Lifecycle Sustainability", IEEE International Conference on Industrial Informatics, 2006, pp. 548-553.
U.S. Appl. No. 13/275,983, filed Oct. 18, 2011, David D. Brandt.
Jawahir, I. S., et al. "Total life-cycle considerations in product design for sustainability: A framework for coomprehensive evaluation." Proc. 10th Int. Research/Expert Conf. (TMT 2006), Barcelona, Spain, 2006.
Dillenburg, Stephen, Timothy Greene, and O. Homer Erekson. "Aproaching socially responsible investment with a comprehensive ratings scheme: total social impact." Journal of Business Ethics 43.3 (2003): 167-177.

\* cited by examiner

PRODUCT LIFECYCLE SUSTAINABILITY SCORE TRACKING AND INDICIA

TECHNICAL FIELD

The claimed subject matter relates generally to monitoring the state of a manufactured product and more particularly to determining a sustainability factor impact resulting from the state.

BACKGROUND

Sustainability generally relates to an ability to maintain a desired balance between utilization of resources vis-à-vis the availability or the projected availability of resources. As it relates to the global environment or certain ecosystems therein, modern production and manufacturing industries are increasingly examining the effects of their production on the environment. Each step of a supply chain for manufacturing a good involves material that must be acquired, typically through extraction, refining, or reconstitution. Virtually all steps in the supply chain result in some type of ecological or sustainability impact, whether from the extraction of the materials themselves, or energy consumption, water and other resource utilization, emissions or waste and so forth.

Though a great deal of attention has been paid to the value of sustainability concerns—including stewardship of the environment, energy, or safety factors—often the factors that impact sustainability have been viewed as external to the products. Rather, previous notions of sustainability focus exclusively upon the actual manufacturing of the product or components thereof, including packaging, while ignoring entirely the effects those products have once they enter the stream of commerce.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

An architecture is provided that can facilitate sustainability score tracking or monitoring in connection with a manufactured product as well as suitable display or other indicia or representation of the sustainability score or other sustainability metrics. In particular, the architecture can receive a status update associated with a state, use, operation, or configuration of a manufactured product. Based upon the parameters of the state of the product included in the status update, the architecture can determine an impact value to a lifecycle sustainability score associated with the product.

In one or more non-limiting aspects, the architecture can be configured as a dynamic product label. The architecture can receive an impact value associated with a state of a product that bears or displays the product label. The architecture can further reconfigure the product label as a function of the received impact value and one or more sustainability factors or metrics.

In one or more non-limiting aspects, the architecture can employ one or more sensors for monitoring the state of the product with respect to a set of sustainability factors. Accordingly, the architecture can determine an impact value to the sustainability score associated with at least one sustainability factor included in the set as a function of the state. The architecture can further update the sustainability score based upon the impact value.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
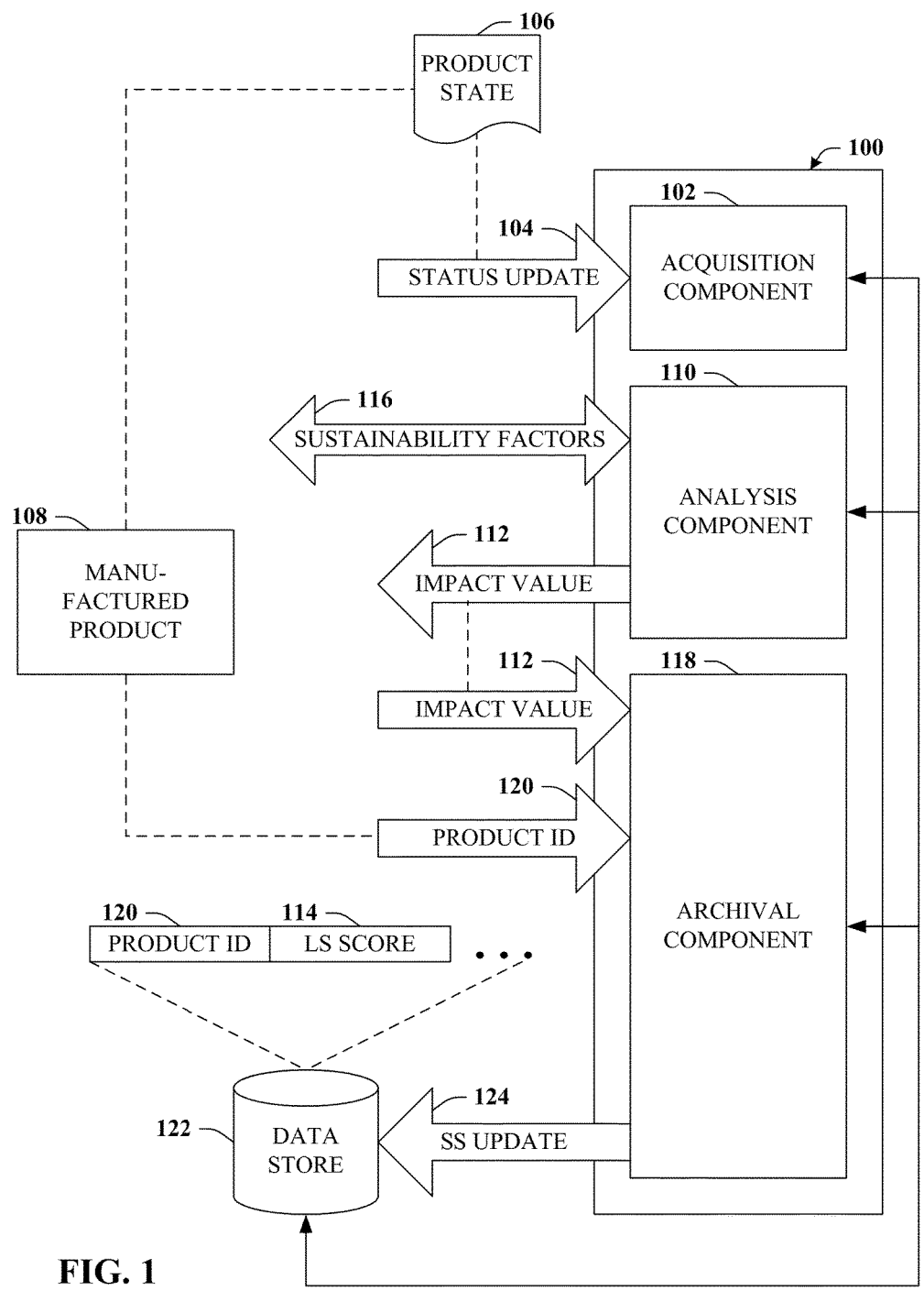
FIG. 1 illustrates a block diagram of a system that can facilitate sustainability tracking in connection with a manufactured good.

Systems and a method are provided for facilitating sustainability score tracking monitoring in connection with a manufactured product as well as dynamic representation of the sustainability score, potentially by way of a configurable label displayed on the product. For example, a status update can be received that describes or relates to an observed state of the product. Based upon this status update, an impact value associated with an impact the observed state of the product has upon one or more sustainability factors can be determined. This impact value can be applied to a current lifecycle sustainability score for the product. While the sustainability score can be applicable to the entire lifecycle for the product, potentially from extraction of the raw materials to recycling or disposal, the monitored state of the product can, but need not necessarily, relate specifically to a post-retail sale state of the product, and thus can be a result of use or consumer policy or consumer-driven action or behavior in connection with the product. Moreover, the lifecycle sustainability score can be presented by way of a dynamic product label or another display or interface.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Referring now to the drawings, with reference initially to FIG. 1, system 100 that can facilitate sustainability tracking in connection with a manufactured good is depicted. Such sustainability tracking can be provided in association with utilization or consumption of the manufactured good, and can be employed in connection with dynamic product labeling, sustainability scoring, or other sustainability-based information or presentations. Generally, system 100 can include acquisition component 102 that can be configured to receive status update 104. Status update 104 can be associated with product state 106, which can reflect a state of a particular manufactured product 108. Typically, state 106 will pertain to a current or recent state of product 108, however, in some cases, state 106 can relate to a common or historic state as well as a forecasted or desired future state, which is further detailed infra. Product 108 can be substantially any suitable manufactured item; however, automobiles, cellular phones, and beverages are common examples that are employed throughout the remainder of this document to serve as exemplary products 108, yet the claimed subject matter is not necessarily limited only to the provided examples.

Additionally, system 100 can also include analysis component 110 that can be configured to determine impact value 112. Impact value 112 can represent an impact (positive or negative) that state 106 has on a lifecycle sustainability score 114 associated with product 108. In other words, state 106 can pertain to a configuration of product 108, a manner of use for product 108, and so forth, any of which can be described by status update 104. For example, consider a cell phone (e.g., product 108) in which an associated battery malfunctions. Suppose further that the old battery is replaced with a new one that is more efficient. In the above case, the malfunction can be described by status update 104, as can the fact that the owner or operator replaces the old battery with a new one. Furthermore, the fact that the old battery was recycled and that a more efficient battery is now in use can both be included in status update 104, and the associated impact values 112 for each of these elements can be determined by analysis component 110 which can potentially affect sustainability score 114.

Calculation or determination of impact value 112 can be based upon one or more sustainability factors 116, which can relate to, e.g., energy consumption or efficiency, water usage or other resource utilization, emissions, an energy provider, raw materials, carbon footprint, waste, effluent, worker safety, corporate policy labor policy, regulatory mandates, or the like. In addition, example sustainability factors 116 grouped by "Triple Bottom Line" is provided below in Table I.

TABLE I

| Planet | People | Profit |
| --- | --- | --- |
| Water usage Expected lifetime energy use of the product Expected energy use of the process TYPE of energy used for manufacturing (solar, wind, nuclear, etc) Carbon emissions "Recyclability", e.g., of packaging "Waste" factor (for product and process) Any other factor which relates to the environmental impact of a product or process | Diversity factors (employment of minorities etc.) for the employer "Training" score - skilled vs. unskilled labor Use of union vs. non-union labor Fair labor practices LWDCR: Lost Work Day Case Rate (Work related injuries and illnesses that result in the employee not being able to perform work; cases per 100 employees) LWDR: Lost Work Day Rate (Measure of severity by accounting for the number of days lost due to work related injuries and illnesses; cases per 100 employees) RCR: Recordable Case Rate (Recordable cases includes any work related injury or illness above a first aid) Any other factor which relates to the safety performance of a product, machine, process, organization, etc. | Utilities costs, including demand charges Marketing/end user appeal (e.g., package design A tested better than package design B and is expected to be more profitable) Any financial measurement impacting the cost or profitability of a product |

Additional potential sustainability factors 116 or indicators thereof can be found at http colon slash slash www dot epa dot gov slash performancetrack slash tools slash prodperf dot htm. Given the examples provided in Table I and elsewhere, it can be appreciated that various sustainability factors 116 can be employed to determine a sustainability score 114 for product 108 as well as the impact (e.g., impact value 112) of a wide variety of parameters associated with the product over the entire lifecycle of the product, which is further detailed with reference to FIG. 2.

Figure 2:
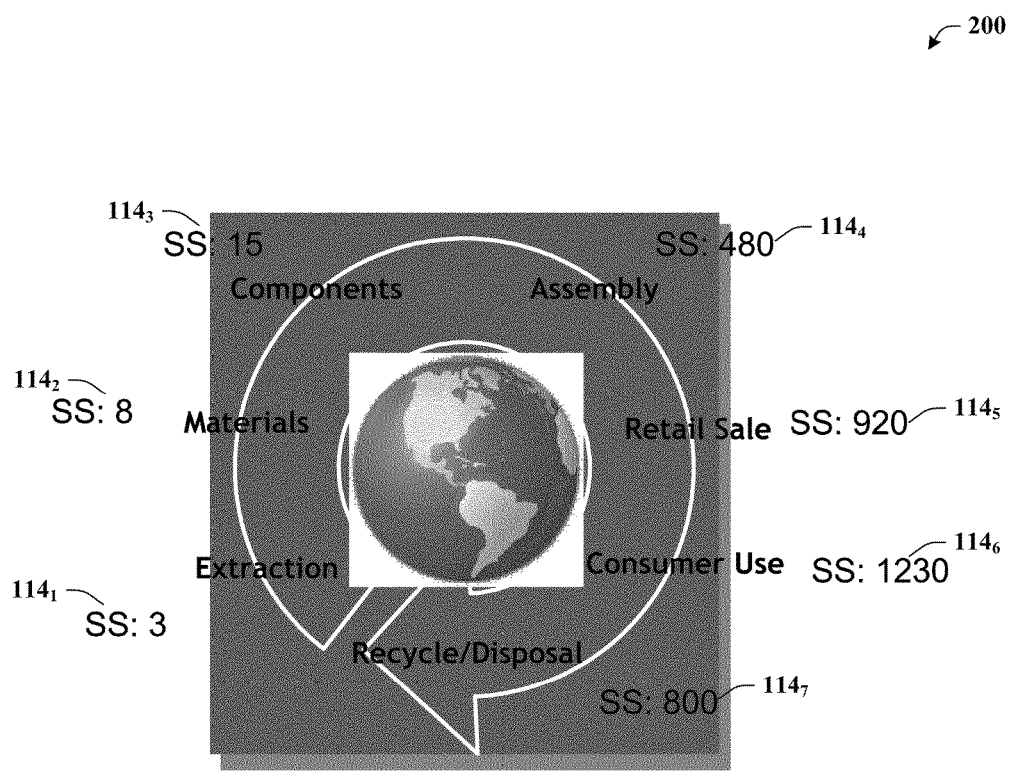
FIG. 2 depicts a block diagram of a graphical depiction of an example product lifecycle.

While still referring to FIG. 1, but turning now as well to FIG. 2, graphical depiction 200 of a product lifecycle is provided. Various categorical stages of the product lifecycle are illustrated by reference numerals $114_1$-$114_7$, which each reflect an example sustainability score 114 at respective stages of the product lifecycle, examples of which are denoted "Extraction," "Materials," "Components," "Assembly," "Retail Sale," "Consumer Use," and "Recycle/Disposal." In one or more aspects of the claimed subject matter, status update 104 can relate to a post-retail sale state 106 of product 108. Accordingly, much of the description herein focuses on sustainability scores $114_6$ and $114_7$. However, it should be appreciated that post-retail sale is but a subset of the entire product lifecycle and the features or aspects described herein can apply to the entire lifecycle.

For example, sustainability scores $114_1$ and $114_2$ (as well as various impact values 112 that contribute to sustainability scores 114) can be compiled in connection with industries relating to mining, drilling, smelting, refining, or the like, whereas sustainability scores $114_3$ and $114_4$ can be associated with manufacturing businesses or the like. Likewise, sustainability score $114_5$ can pertain to operations of wholesalers and retailers. In essence, at any stage in the product lifecycle, a status update 104 can be received, from which impact value 112 can be derived, which suitably affects sustainability score 114. At any point in the lifecycle, sustainability score 114 can be tracked by way of product ID 120, which can identify manufactured product 108 as well as components (e.g., materials, subparts . . . thereof.

Continuing the discussion of FIG. 1, system 100 can further include archival component 118 that can be configured to employ product ID 120 that, potentially uniquely, identifies any manufactured product 108. In particular, product ID 120 can be employed to reference associated records included in data store 122, and therefore to update the lifecycle sustainability score 114 for that product 108, which is maintained by data store 122. Such update is illustrated by sustainability score update 124, and can include, inter alia, impact value 112. It should be understood that data store 122 is intended to be a repository of all or portions of data, data sets, or information described herein or otherwise suitable for use with the claimed subject matter. Data store 122 can be centralized, either remotely or locally cached, or distributed, potentially across multiple devices and/or schemas. Furthermore, data store 122 can be embodied as substantially any type of memory, including but not limited to volatile or non-volatile, solid state, sequential access, structured access, or random access and so on. It should be understood that all or portions of data store 122 can be included in system 100, or can reside in part or entirely remotely from system 100.

Furthermore, to extend application of sustainability scoring, it should be appreciated that product ID 120 can be applicable not only to manufactured products 108, but also to various services related to those products 108. For example, consider a trolley or bus manufactured for mass transit. One product ID 120 can reflect the actual product 108 (e.g., the trolley) while a second product ID 120 can represent, e.g., a line of the transit provider that utilizes the trolley. Thus, both the trolley and the transit line can each be associated with distinct, though related product IDs 120. Moreover, as is described in more detail with reference to FIGS. 4 and 5, each sustainability score 114 can (but need not) be respectively based on a different set of sustainability factors 116, which can provide more dynamic or appropriate ratings for all parties involved, yet will typically be based at least in part upon various indicated states 106 that are aggregated or monitored by way of status update 104.

Figure 3A:
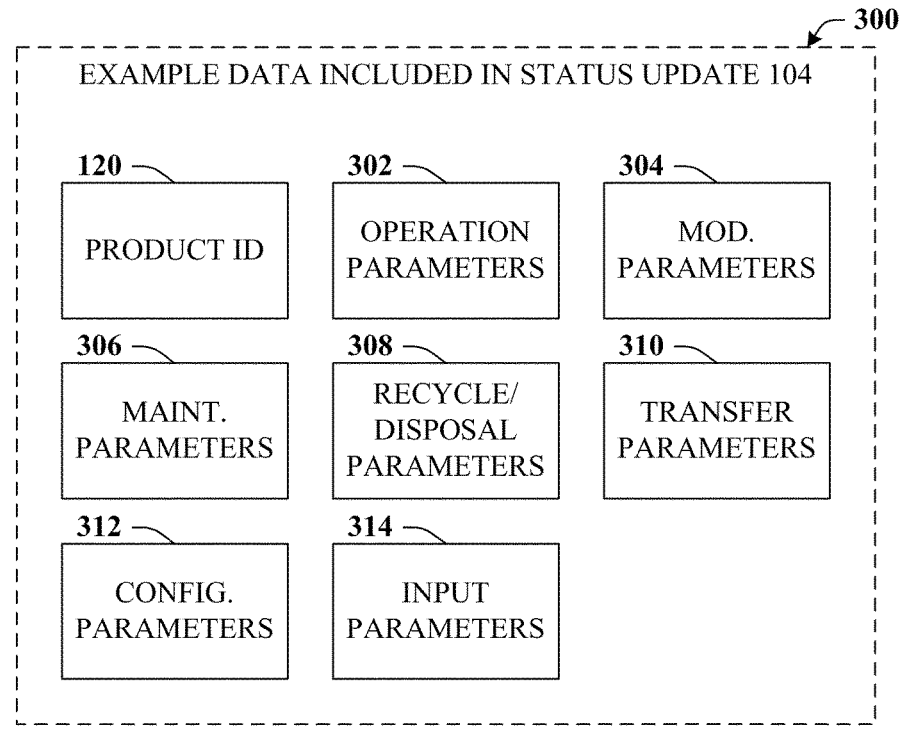
FIG. 3A illustrates a block diagram of example parameters that can be included in status update 104.
Figure 3B:
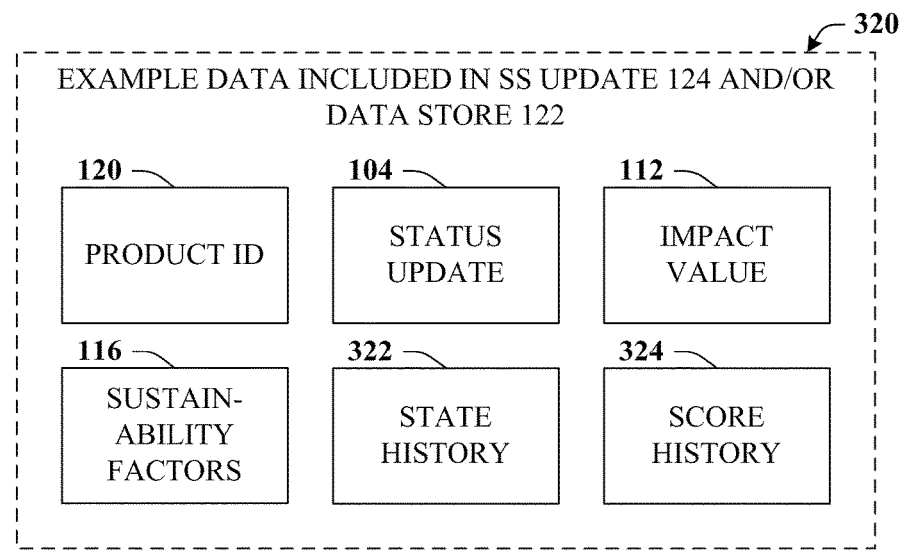
FIG. 3B provides block diagram of example data that can be included in sustainability score update 124 or otherwise maintained by data store 122.

Accordingly, FIGS. 3A and 3B can now be referenced which provide numerous illustrations relating to status updates 104, sustainability score update 124, and/or data managed or maintained by data store 122. In particular, FIG. 3A depicts example parameters 300 that can be included in status update 104, while FIG. 3B illustrates example data 320 that can be included in sustainability score update 124 or otherwise maintained by data store 122. With reference specifically to example parameters 300, status update can include product ID 120. In addition, status update 104 can include operation parameters 302 that can relate to, e.g., a mode of operation or an operating environment for all or a portion of product 108 described by product ID 120. For example, rapid acceleration versus gradual acceleration for an automobile; reuse of a receptacle versus immediate disposal or even recycling once the original contents are consumed; or a thermostat setting for a heating, air conditioning or ventilation (HVAC) system at night or at different times of the year or with respect to the ambient weather conditions or the state of other related environmental elements (e.g., insulation rating, open/closed doors or windows . . . ) can all be examples of operation parameters 302 that can be captured by or included in status update 104. Collection or acquisition of various information included in status update 104 is further discussed in connection with FIG. 6, however, numerous examples are introduced here as well.

Likewise, modification parameters 304 associated with all or a portion of product 108 can be included in status update 104. One example was provided above in the scenario in which a battery for a cell phone was replaced with a new battery. Accordingly, the remainder of the lifecycle for the old battery (if appropriate) as well as the component sustainability metrics for the new battery can be applied to or integrated with a sustainability score 114 for the host cell phone by way of impact value 112. Similarly, status update 104 can also include maintenance parameters 306 that can relate to upkeep, repair, or lack thereof for the associated product 108 as well as to recycle/disposal parameters 308 (e.g., recycling the old battery). Collection of parameters 302 and 304 can be accomplished automatically, inter alia, by software routines at boot-up or during status check or interrogation operations. As another example, collection of parameters 304, 306, 308 can be conveniently accomplished by repair shops or recycling centers with very little, if any, additional overhead than what already exists as part of normal accounting. For instance, a bar code scan of the old battery as it is being replaced, repaired, or recycled can be referenced for populating the associated parameters include in status update 104, as can a scan of the new battery being installed and invoiced for billing.

In addition, transfer parameters 310 can also be included in status update 104. For instance, ownership, sales, trades, exchanges, title transfers, and so on can be monitored as well. Hence, a product ID 120 associated with a transit service can be suitably maintained after that service upgrades the equipment. In particular, while the product ID 120 for the old equipment can be continually monitored, various impact values 112 associated with that old equipment after the transfer need not reflect upon a score or rating associated with the transit service, which is further detailed in connection with FIG. 5. Configuration parameters 312 and input parameters 314 can also be included in status update 104, and are both further discussed infra, in particular with reference to FIGS. 4 and 7, respectively.

With particular reference to example data 320, illustrated are various data that can be included in sustainability score update 124 or otherwise maintained by data store 122. As with example parameters 320, example data can also include product ID 120. Indeed, all portions of status update 104 can be included in sustainability score update 124, and thus archived by data store 122 for later access or recall. Moreover, impact value 112 can be included in sustainability score update 124, as can various sustainability factors 116. Regardless, based upon the data input by way of sustainability score update 124, or by other means, data store 122 can maintain state history 322 and sustainability score history 324 for every individual product 108 or other unique product ID 120. Such histories 322 and 324 can be compiled or aggregated over time by way of sustainability score update 124 that includes at least a portion of status update 104.

Figure 4:
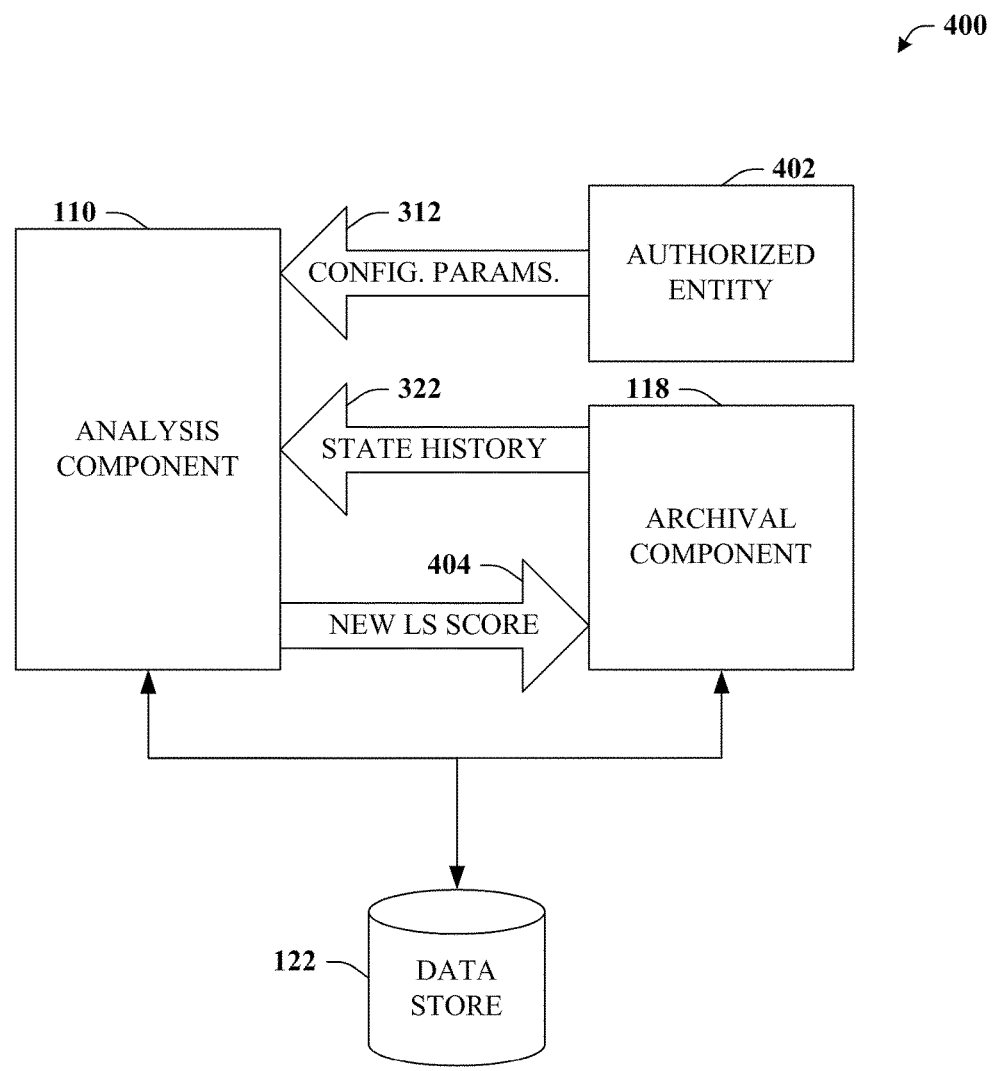
FIG. 4 is a block diagram of a system that can provide customized impact values and/or lifecycle sustainability scores.

Referring now to FIG. 4, system 400 that can provide customized impact values and/or lifecycle sustainability scores is illustrated. In general, system 400 can include analysis component 110 that can determine impact value 112 and archival component 118 that can update the lifecycle sustainability score 114 as substantially described supra. Additionally, system 400 can further include authorized entity 402. Authorized entity 402 can be a proxy for, e.g., a manufacturer, a private certification organization or standards board, a government agency, or even a consumer or individual owner or operator of product 108. More broadly, authorized entity 402 can be substantially any individual or entity (or proxy thereof) registered (e.g., account member) or otherwise authorized (e.g., public search engine) to submit configuration parameters 312. Configuration parameters 312 can relate to one or more sustainability factors 116, in particular to which sustainability factors 116 should be employed as well as associated weights for the individual sustainability factors 116.

For example, a first authorized entity 402 might care about a single value, such as the overall carbon impact, water usage, or emissions, for a given product 108. A second authorized entity 402, however, might be concerned about emissions as well as the use of child labor. Use of child labor might be expressed as a 'true/false' or binary value, whereas other parameters 312 can be absolute or relative values and can be accompanied by an associated weighting factor. In accordance therewith, analysis component 110 can further recalculate impact values 112 as well as new lifecycle sustainability score 404 for product 108 (or an associated product ID 120) based upon the provided configuration parameters 312. Given that any particular impact value 112 can be based upon a previous product state 106 (detailed by a previous status update 104), it should be understood that multiple impact values 112 can be recalculated to arrive at new sustainability score 404. Hence, archival component 118 can retrieve state history 322 from data store 122 and provide the state history 322 to analysis component 110, or analysis component 110 might retrieve this information directly.

Regardless, each product state 106 included in state history can be assigned a suitable impact value 112 specific to the provided configuration parameters 312, and the resulting new lifecycle score 404 can be constructed. Moreover, archival component 118 can store to data store 122 a disparate lifecycle sustainability score 404 for each set of configurations parameters 312 that are received. Furthermore, each such disparate lifecycle sustainability score 404 can be associated in a suitable manner with the authorized entity 402 that supplies the given configuration parameters, potentially by a distinct, yet related product ID 120.

Figure 5:
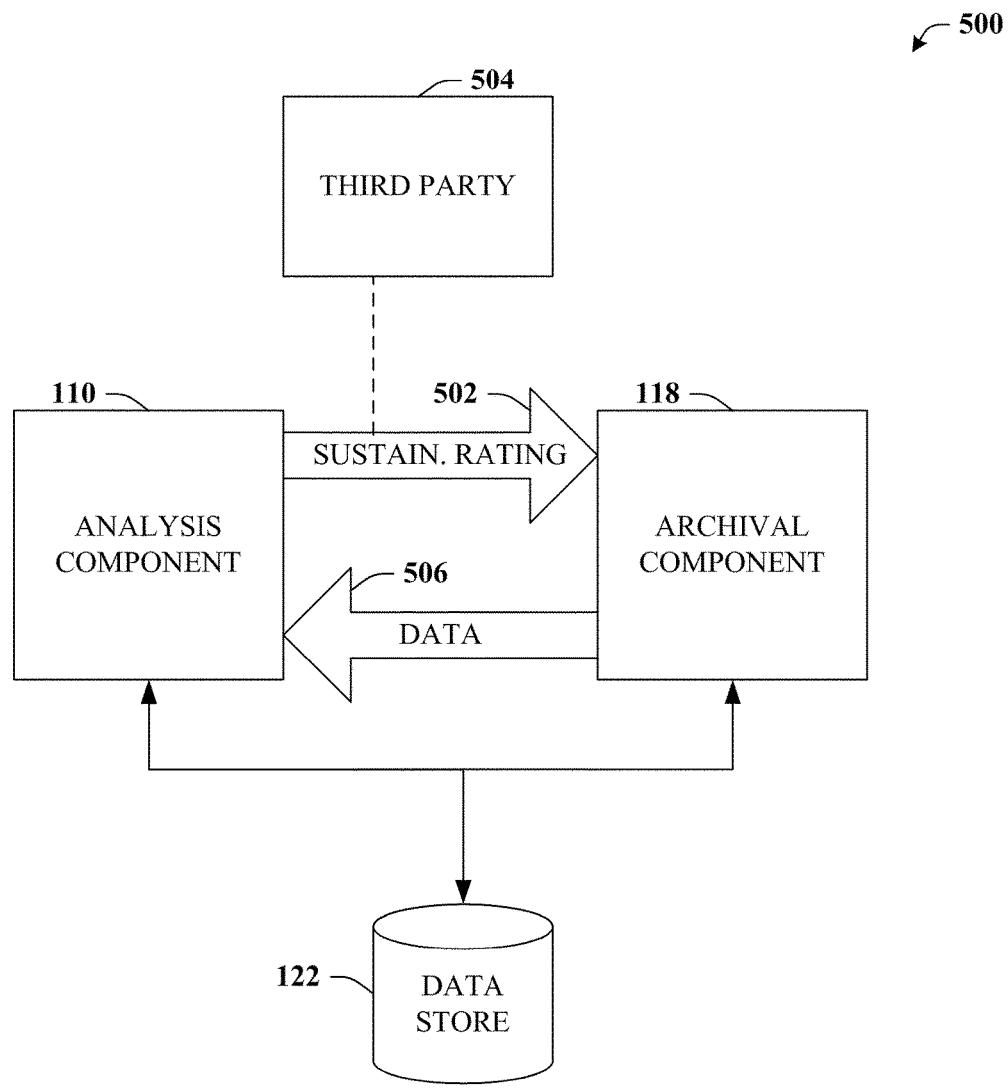
FIG. 5 depicts a block diagram of a system that can facilitate third party ratings based upon a variety of suitable factors.

With reference now to FIG. 5, system 500 that can facilitate third party ratings based upon a variety of suitable factors is depicted. As with system 400, system 500 can also include analysis component 110 and archival component 118 as substantially described supra. In addition to what was detailed above, analysis component 110 can generate or update a third party sustainability rating 502. Third party sustainability rating 502 can relate to substantially any third party 504, which can be a proxy for a consumer, user, owner, producer, et cetera of product 108. As with other information detailed herein, third party sustainability rating 502 can be provided to data store 122 by, e.g., archival component 118.

Sustainability rating 502 can be constructed (or updated) based upon data 506, which can be retrieved from data store 122 and can include, e.g., sustainability score 114 for product 108, a given impact value 112, an additional sustainability factor 116 or a state history 322 or other transactions associated with product 108. It should be called out that while sustainability score 114 can be employed to reflect an ongoing overall impact of product 108 during its lifecycle, sustainability rating 502 on the other hand can specifically reflect upon acts associated with product 108, such as third party 504.

For example, consider two cell phones or other products 108 manufactured as part of the same batch or process. Consider further that both phones are shipped to a retailer in the same load and are sold on the same day to two different customers of the retailer, Ashley and Ross. While information associated with both phones can be maintained by data store 122 under distinct product IDs 120, at the time of purchase, it is exceedingly likely that respective sustainability scores 114 for both phones will be substantially identical, and this value can reflect upon the manufacturer of the phones as well as the retailer or other third parties 504 in supply chain. However, post-retail sale, running sustainability scores 114 for the two phones, respectively, will also be impacted by the behavior of Ashley or Ross. Thus, sustainability rating 502 can be assigned to consumers as well as manufacturers.

For instance, if Ashley recycles her old battery and installs a more efficient one, while Ross throws his old battery in the garbage and installs a less efficient battery, then Ashley's phone will likely register a better sustainability score 114 than that for Ross's phone, yet these differences (positive or negative) are largely independent of the manufacturer and thus need not be reflected in a sustainability rating 502 associated with the manufacturer. On the other hand, the design or efficiency of the phones or a recall policy or a stipend or incentive to replace the battery with a more efficient one or to recycle the old battery might be more suitable for ratings 502 associated with the manufacturer. Regardless, sustainability rating 502, like sustainability score 114 can be determined based upon information included in status updates 104. For example, if, over time, Ashley has a tendency to only recharge her cell phone when need, while Ross tends to leave his charger plugged in and charging the cell phone battery overnight whether the power level if low or not, then this pattern of behavior can be captured by state history 322.

Figure 6:
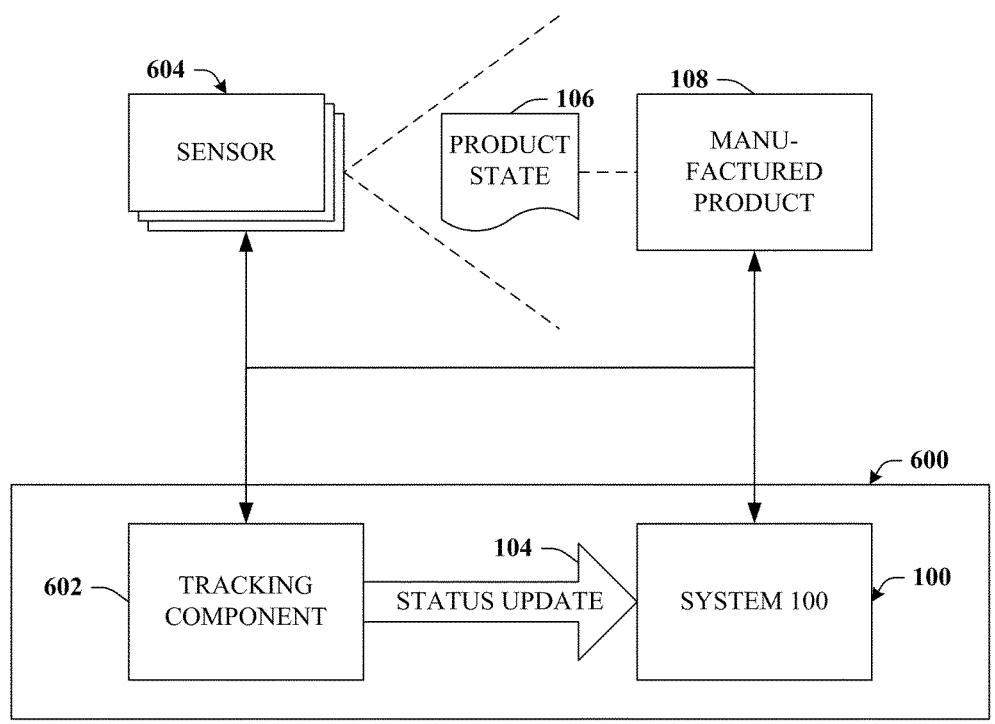
FIG. 6 illustrates block diagram of a system that can track, trace, or monitor products and/or states associated therewith in connection with sustainability scores.

Turning now to FIG. 6, system 600 that can track, trace, or monitor products and/or states associated therewith in connection with sustainability scores is provided. As depicted, system 600 can include all or portions of system 100 detailed supra with reference to FIG. 1, as well as other components described herein. In addition, system 600 can include tracking component 602 that can be configured to employ one or more sensors 604 or devices (potentially hardware or software) to monitor product state 106 and/or manufactured product 108. Based upon the information or data collected by sensors 604, tracking component 602 can construct status update 104, which can be obtained by acquisition component 102 as discussed above.

While sensor 604 can relate to various types of emission detectors or control or operation components, it should be appreciated that other types of sensors can be useful or employed in connection with the claimed subject matter. For instance, in one or more aspects, the set of sensors 604 can comprise a radio frequency identification (RFID) module, unit, or tag. As another example, sensor 604 can be or relate to a global positioning satellite (GPS) module, unit, or device. RFID or GPS can relate to largely to location, which can be indicative a variety of a factors relevant to status update 104 (e.g., location itself, operation parameters 302, weather or extant conditions . . . ). Still another example sensor 604 can be a bar code reader, which was introduced above in connection with the scanning of a replaced and replacement battery example. In another aspect, sensor 604 can be a camera (or other optical state recognition module). For instance, a camera, potentially in connection with optical recognition techniques or technologies can be employed to ascertain a variety of information associated with product state 106. Moreover, sensor 604 can relate to software routines or other monitoring or detection-based software state recognition modules.

Figure 7:
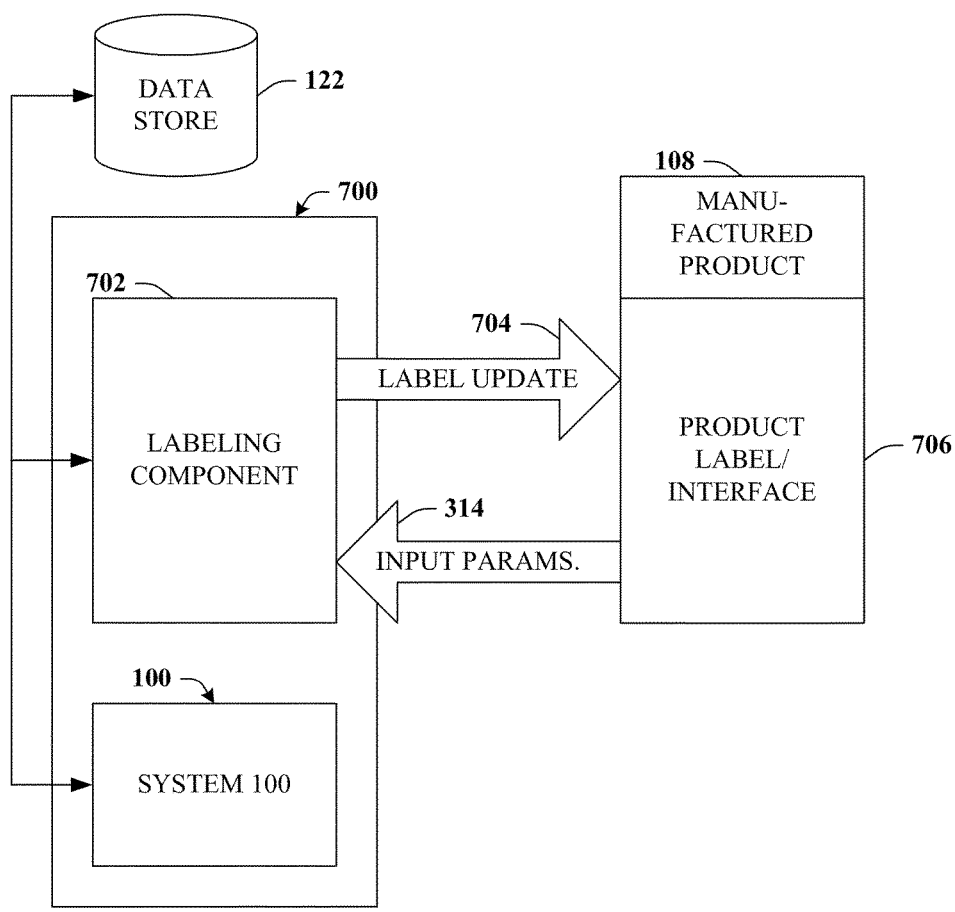
FIG. 7 is a block diagram of a system that can facilitate dynamic lifecycle product labeling or presentation in connection with sustainability factors.

With reference to FIG. 7, system 700 that can facilitate dynamic lifecycle product labeling or presentation in connection with sustainability factors is illustrated. Generally, system 700 can include all or portions of system 100 as substantially detailed previously. Furthermore, system 700 can include labeling component 702 that can be configured to construct label update 704 based upon a sustainability score (e.g., sustainability score 114 or new sustainability score 404). In one or more aspects of the claimed subject matter, label update 704 can relate to or include a set of instructions for adjusting a product label or an interface presented or displayed by product 108. The product label or interface both are referred to by way of reference numeral 706, and can relate to a configurable label displayed by product 108, such as label 706 included on a beverage can or bottle, as well as to an electronic display commonly employed in connection with graphical user interfaces (GUI) or human-machine interfaces (HMI) included in, say, a car or computer. Accordingly, due to the sophistication and/or configuration of label/interface 706, label update 704 can take a variety of forms.

For example, when updating an interface 706, label update 704 can include data formatted for a particular operating system or application or according to a particular protocol. In contrast, when product label 706 is being updated, label update 704 can be a control signal, potentially electronic, optical, mechanical, piezoelectric, chemical, electrochemical and so forth or combinations thereof. Regardless of the configuration or form of label update 704 or of product label/interface 706, label update 704 can be constructed based upon a sustainability score 114, 404 or potentially updated based upon one or more impact value 112. Moreover, label/interface 706 can be configured according to the labeled update to present, typically visually, indicia associated with sustainability score 114, 404. For instance, when a case of beverages are shipped out from a factory, conventional labels on the cans or bottles do not change irrespective of how those (or other products) are purchased or consumed or otherwise used. Yet, as detailed herein, various sustainability scores associated with those products can and most likely will change relative to others. Such changes can be maintained by data store 122 for each individual bottle. Moreover, the consumption or use of a particular bottle can be depicted by the labeling of the product itself. For example, if one bottle is refilled multiple times before disposal or recycling, that bottle might have a better sustainability score 112, 404 than another bottle that is disposed of or recycling immediately after the contents are consumed. It should be appreciated that in the case bottles or beverages as well as many other relatively inexpensively priced products 108, label 706 can include all or portions of system 700 yet designed for minimal impact to price. For example, a configurable label that dynamically adjusts based upon signals or detection mechanisms included in the product 108.

With respect to more sophisticated or higher-end products that typically include interface 706, such as an automobile, GPS or other sensors 604 can be employed to track various sustainability metrics associated with the automobile. By associating the location of the automobile (or other product 108) and other data such as travel patterns, weather conditions, type and amount of fuel used by the vehicle (e.g., operation parameters 302, state history 322 . . . ), label update 706 can provide, e.g., the impact to the ozone layer of various current or past trips or other uses of the vehicle. In addition, labeling component 702 can construct or update label update 704 based upon an input to label/interface 706, which is denoted by input parameters 314. For example, these input parameters 314 can relate to an intended or desired future state of product 108. As one example, interface 706 employed above to display the impact to the ozone due to various use of the vehicle can accept input relating to a desired or future trip, and thus forecast the same effects on the ozone (or to another sustainability factor 116) for those future travel plans.

Figure 8A:
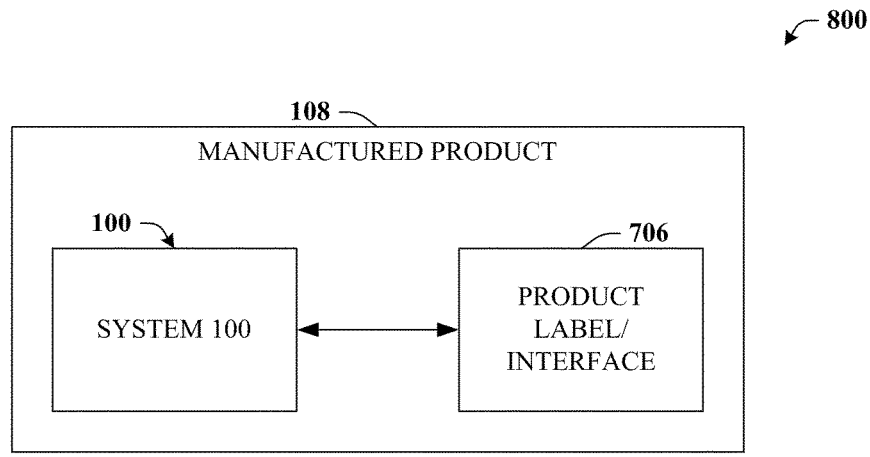
FIG. 8A provides block diagram of an example configuration or topology in which suitable components are included in the manufactured product.
Figure 8B:
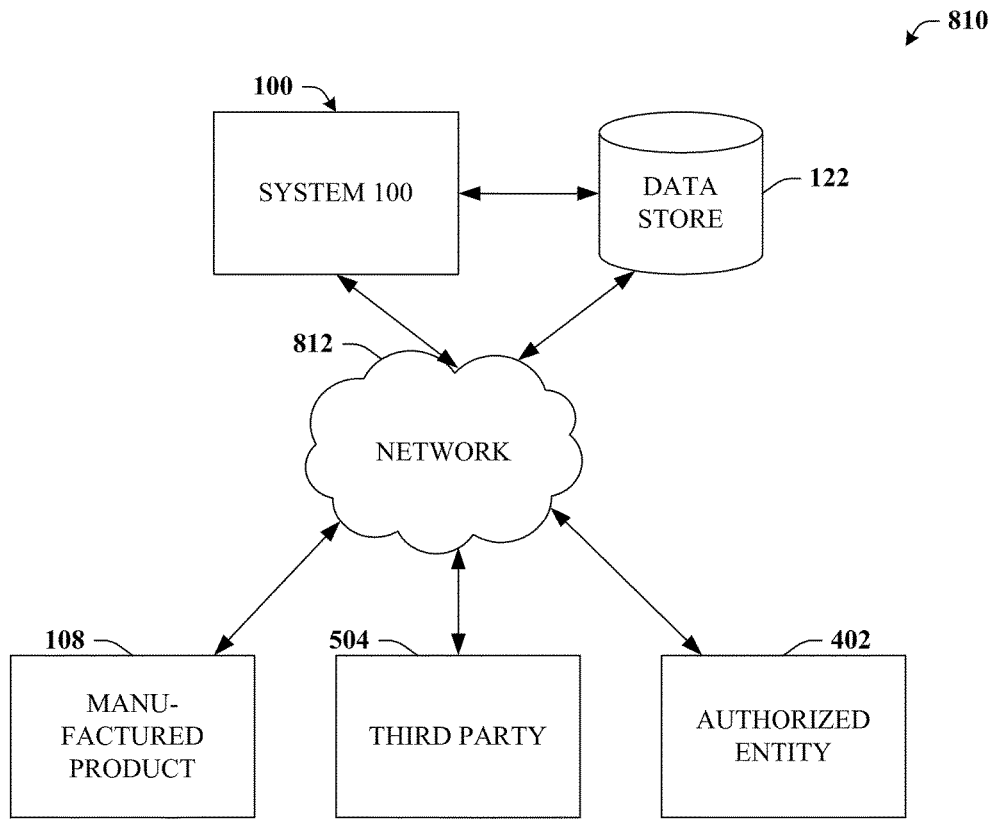
FIG. 8B depicts a block diagram of an example configuration or topology directed toward providing features, aspects or information as a network-accessible service.

Turning now to FIGS. 8A and 8B, various example topologies or configurations of the claimed subject matter are provided. In particular, FIG. 8A illustrates topology 800 in which suitable components are included in the manufactured product. For example, as illustrated, system 100 (or systems 600 or 700 or other components detailed herein) or portions thereof can be included in product 108. In such an aspect, product 108 can be substantially self-contained or independent, yet still be capable of providing a number of the features detailed herein. For example, displaying or otherwise presenting indicia associated with sustainability scores 114, 404, sustainability factors 116, impact values 112 and so on can be facilitated by way of product label/ interface 706. Appreciably, according to topology 800, manufactured product can also (but need not be required to) include network adapters or the like in order to obtain additional suitable data.

Referring now specifically to FIG. 8B, topology 810 depicts a configuration directed toward providing features or aspects provided or facilitated by system 100 (or systems 600 or 700) or information included in data store 122 as a network-accessible service. For example, manufactured product 108, third party 504, or authorized entity 402 can access services or data provided by network 812, which can be substantially any suitable wide area network (WAN), local area network (LAN) or a cloud-based or mesh-based network.

Figure 9:
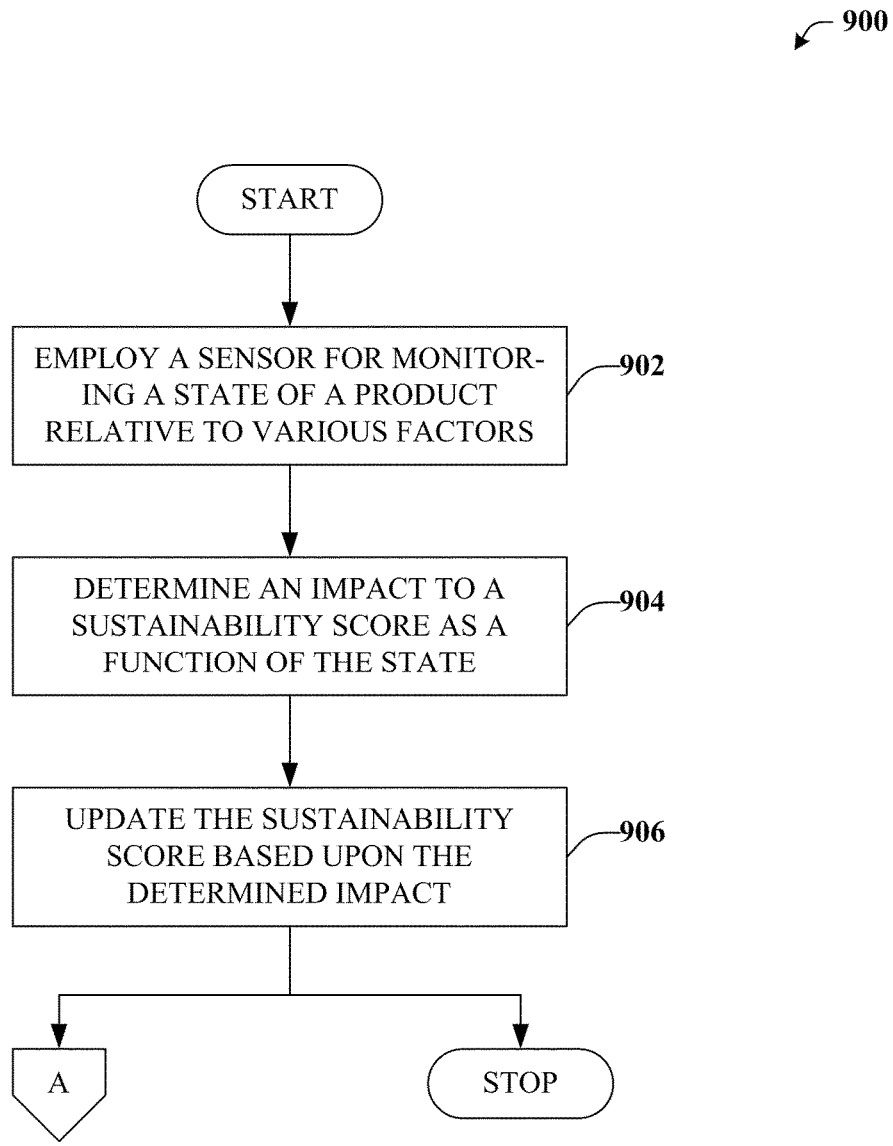
FIG. 9 illustrates an exemplary flow chart of procedures that define a method for facilitating sustainability tracking in connection with use or consumption of a manufactured good.
Figure 10:
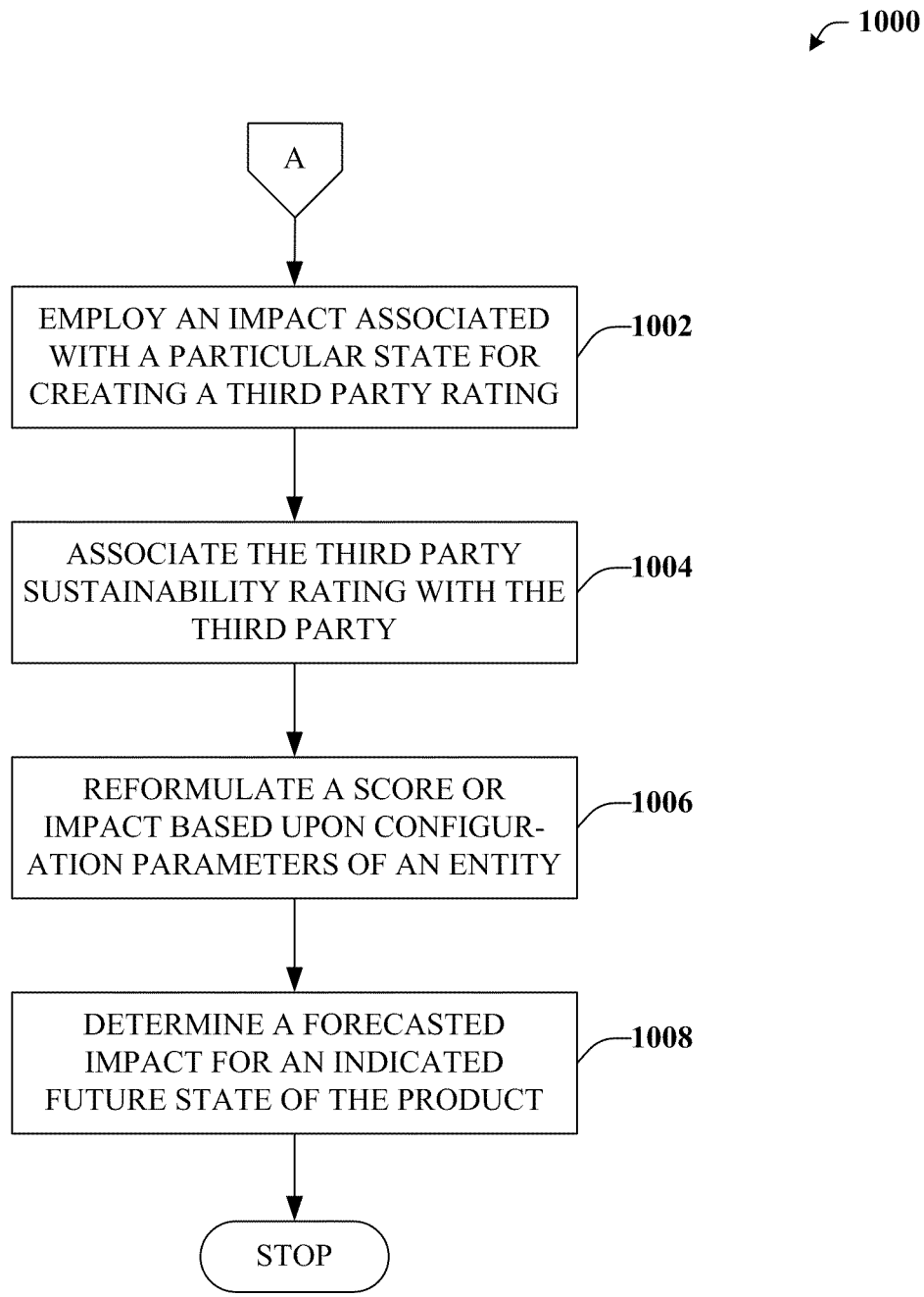
FIG. 10 depicts an exemplary flow chart of procedures defining a method for providing additional features or aspects in connection with sustainability tracking.

FIGS. 9 and 10 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts need necessarily be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 9, exemplary method 900 for facilitating sustainability tracking in connection with use or consumption of a manufactured good is provided. Generally, at reference numeral 902, one or more sensors can be employed for monitoring a state of a product with respect to a set of sustainability factors. For example, the monitored state can relate to sustainability factors such as energy consumption or efficiency, water usage or other resource utilization, emissions, an energy provider or type of energy, raw materials, carbon footprint, waste, effluent, recyclability, worker safety, corporate policy labor policy, regulatory mandates, and so on. The sensors can thus monitor various operation parameters, modification parameters, maintenance parameters, transfer parameters in connection with all or a portion of the product (e.g., the state) in connection with the above-mentioned sustainability factors or other suitable sustainability factors.

At reference numeral 904, an impact to a sustainability score associated with one or more sustainability factors included in the set can be determined, for example as a function of the state identified or monitored in connection with reference numeral 902. Accordingly, an impact with respect to sustainability factors can be constructed based upon various uses or utilizations of the product. At reference numeral 906, the sustainability score can be updated based upon the impact determined at reference numeral 904. Thus, the sustainability score rather than representing a static value associated with the product can instead be dynamic and evolve over time to reflect actual, monitored use or utilization as described by various state readings.

Turning now to FIG. 10, exemplary method 1000 for providing additional features or aspects in connection with sustainability tracking is depicted. In general, at reference numeral 1002, third party impact associated with a particular state of the product, such as the impact determined in connection with reference numeral 904 can be employed for constructing or updating a sustainability rating for a third party. In particular, although determined in substantially similar manner, third party impact can relate specifically to states of the product that result either entirely or partially from actions or behavior of the third party such as a consumer, owner, or operator of the product. Accordingly, at reference numeral 1004, while the sustainability score is typically assigned to or associated with the product or a service that employs the product, the sustainability rating can be associated with the third party.

Next to be described, at reference numeral 1006, at least one of the sustainability score or the impact can be reformulated based upon one or more configuration parameters or sustainability factors provided by an authorized entity, such as, e.g., a private certification organization or standards board, a government agency, or even a consumer or individual owner or operator of the product. Thus, ultimate sustainability scores or the individual impacts as well as the sustainability factors employed for analysis or processing can be customized or tailored according to the authorized entity's specification or preferences. Furthermore, at reference numeral 1008, a forecasted impact can be determined in a manner substantially similar to that employed in connection with the impact discussed in connection with reference numeral 904. However, in this case, the forecasted impact can be determined for an indicated future state of the product rather than for an observed or monitored state. Thus, the forecasted impact can be based upon at least one of the sustainability score for the product, one or more sustainability factors, a state history associated with the product or a score history associated with the product.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

Furthermore, in general, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A system that facilitates sustainability tracking in connection with a manufactured good, comprising:
   at least one processor coupled to memory retaining instructions carried out by the processor, in operation, for:
   a tracking component that, in operation, employs one or more sensors to monitor a state of a manufactured product;
   an acquisition component that, in operation, receives a plurality of status updates associated with the state of the manufactured product via the tracking component during a product lifecycle of the manufactured product;
   an analysis component that, in operation, determines an impact value to a lifecycle sustainability score associated with the product based upon at least one of the plurality of status updates, wherein the impact value relates to energy consumption, energy efficiency, energy providers, water usage or other resource utilization, emissions, carbon footprint, waste, effluent, worker safety, corporate policy, labor policy, regulatory mandates, or some combination thereof, associated with the product; and
   an archival component that, in operation, employs a product ID that pertains to the product to access a data store and to update the lifecycle sustainability score maintained by the data store with the impact value; and
   a graphical user interface configured to display the updated lifecycle sustainability score during the product lifecycle in response to receiving an input signal requesting the updated lifecycle sustainability score, wherein the graphical user interface comprises a display coupled to the manufactured product.

2. The system of claim 1, wherein the plurality of status updates pertains to at least one of operation of all or a portion of the product, modification of all or a portion of the product, maintenance of all or a portion of the product, transfer, disposal, or recycling of all or a portion of the product, or addition of a sustainability factor.

3. The system of claim 1, wherein the plurality of status updates relates to a post-retail sale state of the product in the product lifecycle.

4. The system of claim 1, wherein the product ID is associated with the product, or associated with a service provided by the product.

5. The system of claim 1, wherein the archival component, in operation, updates the data store with the plurality of status updates in order to maintain a history of states or transactions associated with the product.

6. The system of claim 5, wherein the analysis component, in operation, recalculates impact values included in the history based upon a configurable set of parameters in order to generate a current sustainability score for each set of parameters provided.

7. The system of claim 6, wherein the archival component, in operation, stores to the data store a respective current sustainability score for each entity that provides a respective set of parameters.

8. The system of claim 1, wherein the analysis component, in operation, generates or updates a third party sustainability rating based upon at least one of the sustainability score of the product, the impact value, an additional sustainability factor, or a history of states or transactions associated with the product.

9. The system of claim 1, wherein the tracking component, in operation, constructs the plurality of status updates based upon information received from the one or more sensors.

10. The system of claim 1, wherein the one or more sensors comprise at least one of an emissions detector, a control or operation sensor, a radio frequency identification (RFID) module, a global positioning satellite (GPS) module, a bar code scanner module, an optical state recognition module, or a software state recognition module.

11. The system of claim 1, further comprising a labeling component that, in operation, constructs a label update based upon a current sustainability score maintained by the data store, wherein the label update comprises at least one of a data set or a set of instructions for updating a product label or an interface that corresponds to the product, wherein the product label or the interface comprises indicia associated with the current sustainability score, a future sustainability score, the impact value, a future impact value, or any combination thereof.

12. The system of claim 11, wherein the labeling component, in operation, constructs the label update based upon an input to the graphical user interface.

13. The system of claim 12, wherein the input relates to an intended or desired future state of the product.

14. A method for facilitating sustainability tracking in connection with use or consumption of a manufactured product comprising:
  employing one or more sensors for monitoring a state of the manufactured product during an entire lifecycle of the manufactured product, wherein the state is monitored with respect to a set of sustainability factors;
  receiving, via one or more computers, a plurality of status updates associated with the state of the manufactured product;
  determining, via the one or more computers, an impact to a sustainability score associated with at least one sustainability factor included in the set as a function of the state based on at least one of the plurality of status updates, wherein the impact relates to energy consumption, energy efficiency, energy providers, water usage or other resource utilization, emissions, carbon footprint, waste, effluent, worker safety, corporate policy, labor policy, regulatory mandates, or some combination thereof, associated with the manufactured product;
  updating, via the one or more computers, the sustainability score based upon the impact; and
  displaying, via the one or more computers in response to receiving an input signal requesting the updated lifecycle sustainability score, the updated sustainability score on a graphical user interface during the lifecycle of the manufactured product, wherein the graphical user interface is coupled to the manufactured product.

15. The method of claim 14, further comprising at least one of the following:
  employing, via one or more computers, a second impact associated with a particular state of the manufactured product resulting from an act or behavior associated with a third party for constructing or updating a sustainability rating for the third party; or
  associating, via one or more computers, the sustainability rating with the third party.

16. The method of claim 14, further comprising at least one of the following:
  reformulating, via one or more computers, at least one of the sustainability score or the impact based upon configuration parameters or sustainability factors provided by an authorized entity; or
  determining, via one or more computers, a forecasted impact for an indicated future state of the manufactured product based upon at least one of the sustainability score for the product, one or more sustainability factors, a state history associated with the manufactured product or a score history associated with the manufactured product.

* * * * *